A. H. SAVY.
MACHINE FOR THE MANUFACTURE OF CHOCOLATE CONFECTIONS.
APPLICATION FILED MAR. 7, 1907.
941,537.
Patented Nov. 30, 1909.
5 SHEETS—SHEET 2.
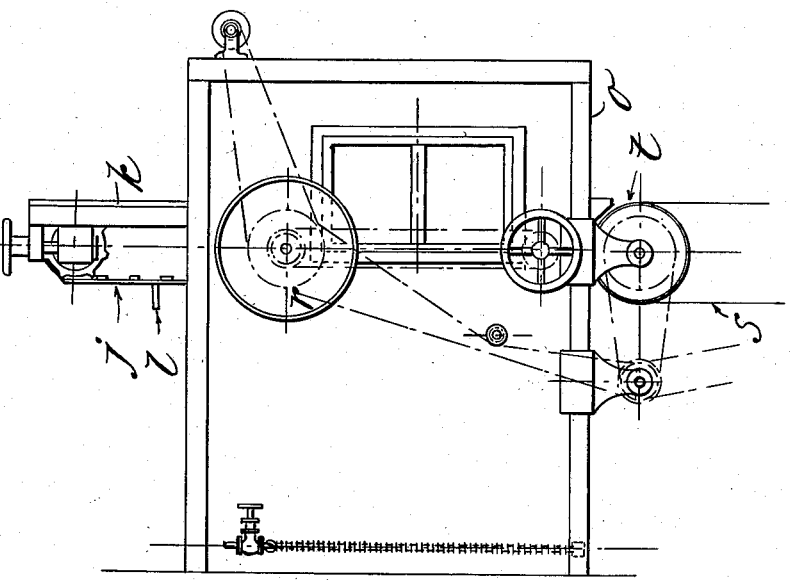
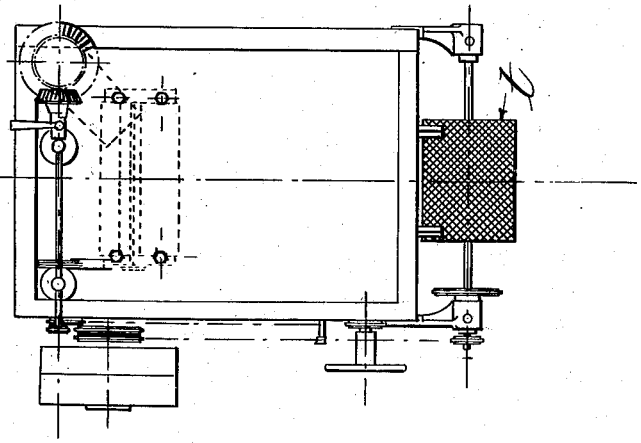
Witnesses:
H. L. Sprague
H. W. Bowen
Inventor:
Alfred H Savy
by Chapin & Co.
Attorneys.

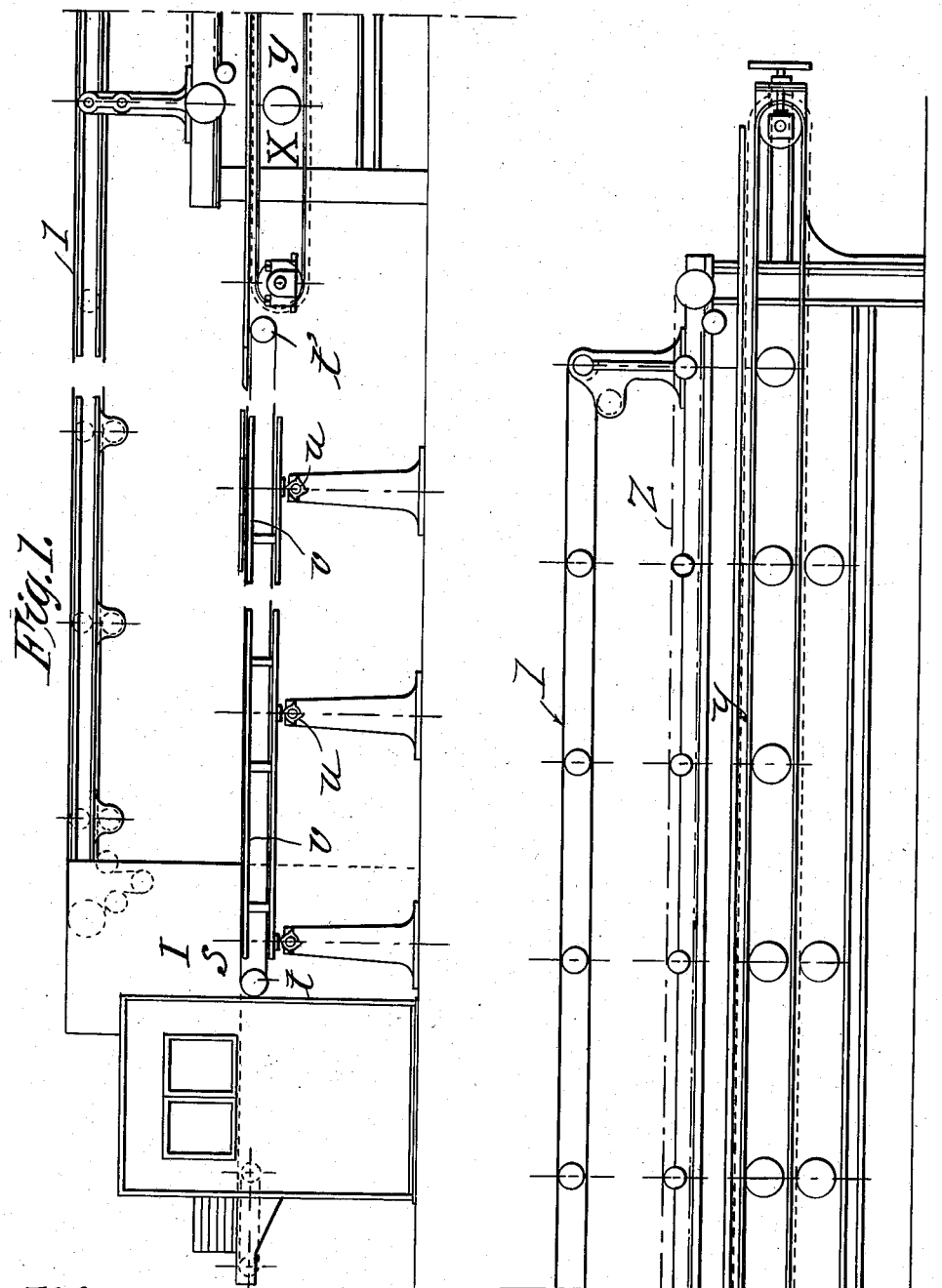

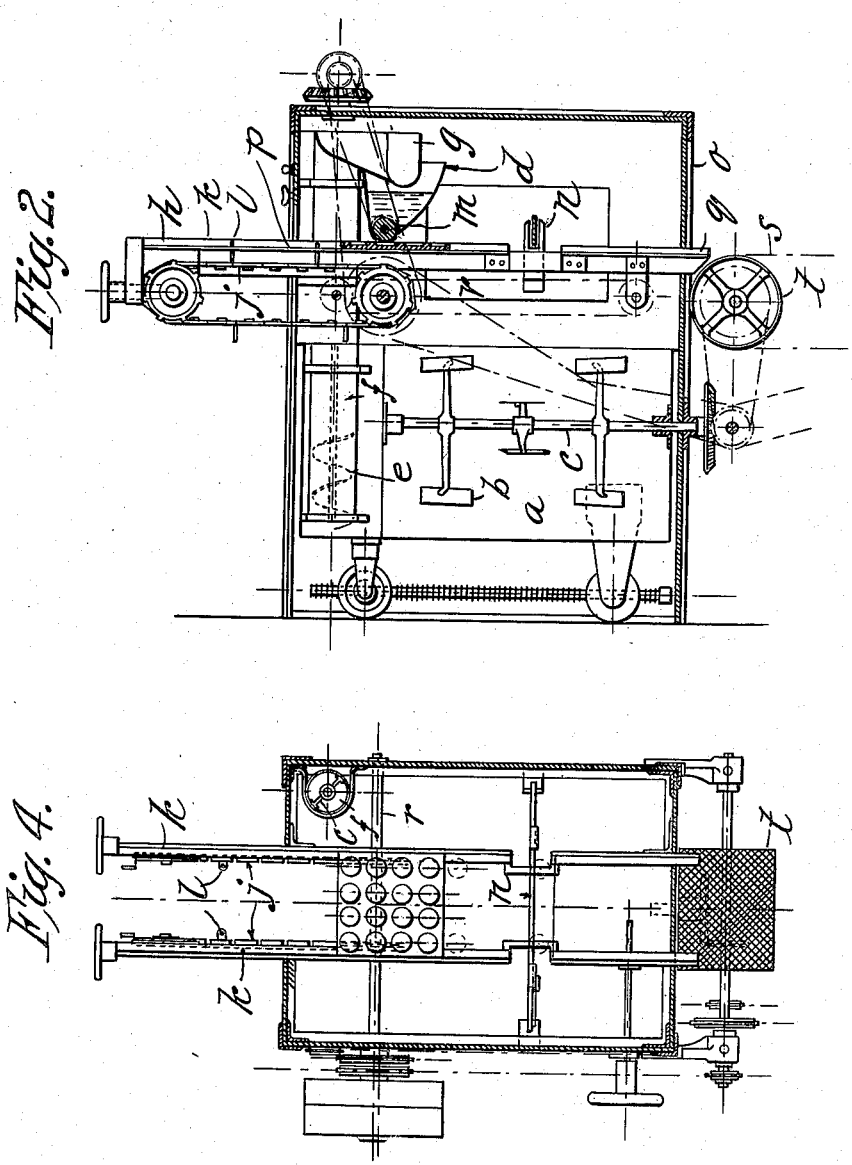

A. H. SAVY.
MACHINE FOR THE MANUFACTURE OF CHOCOLATE CONFECTIONS.
APPLICATION FILED MAR. 7, 1907.
941,537.
Patented Nov. 30, 1909.
5 SHEETS—SHEET 4.
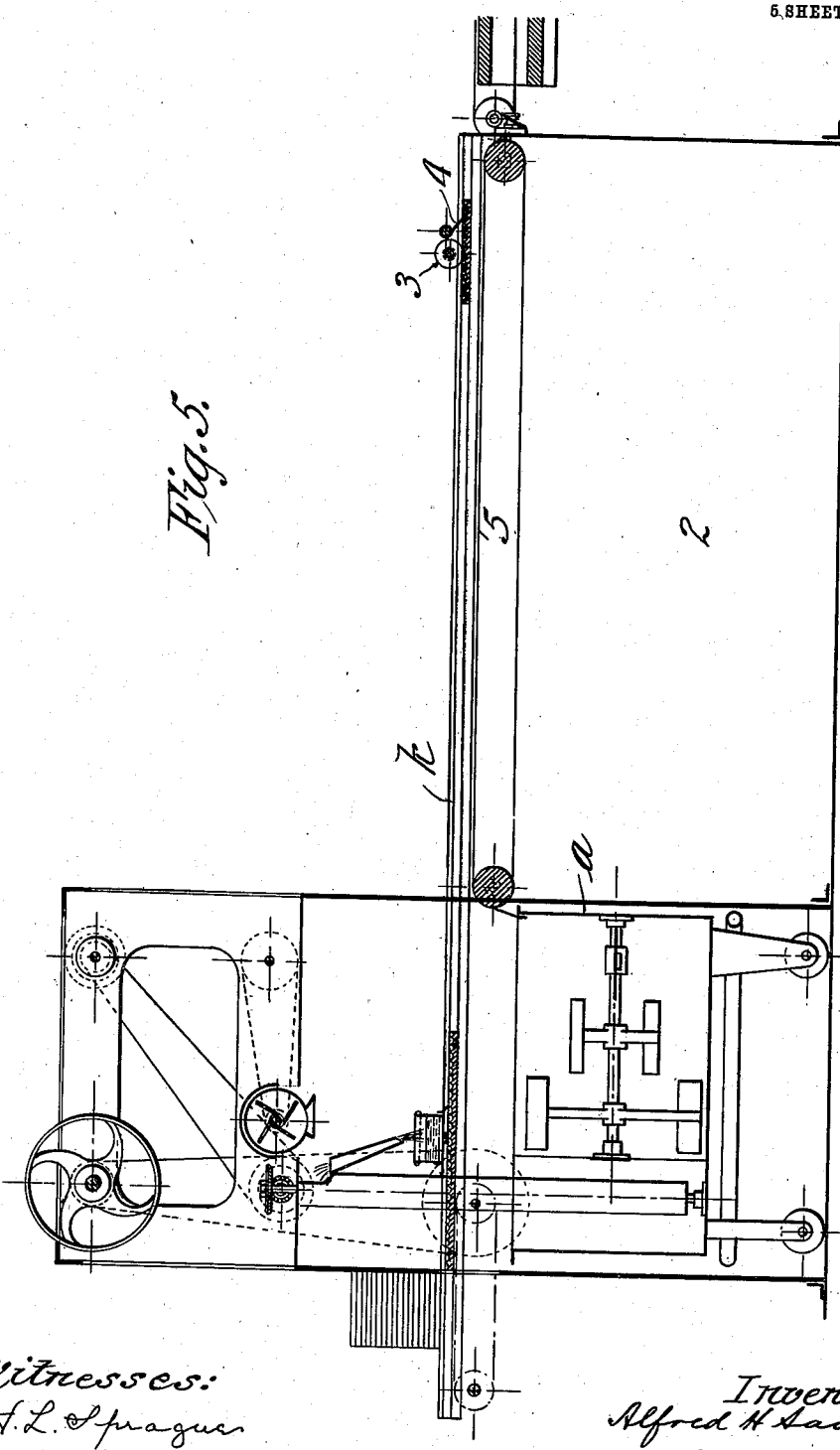

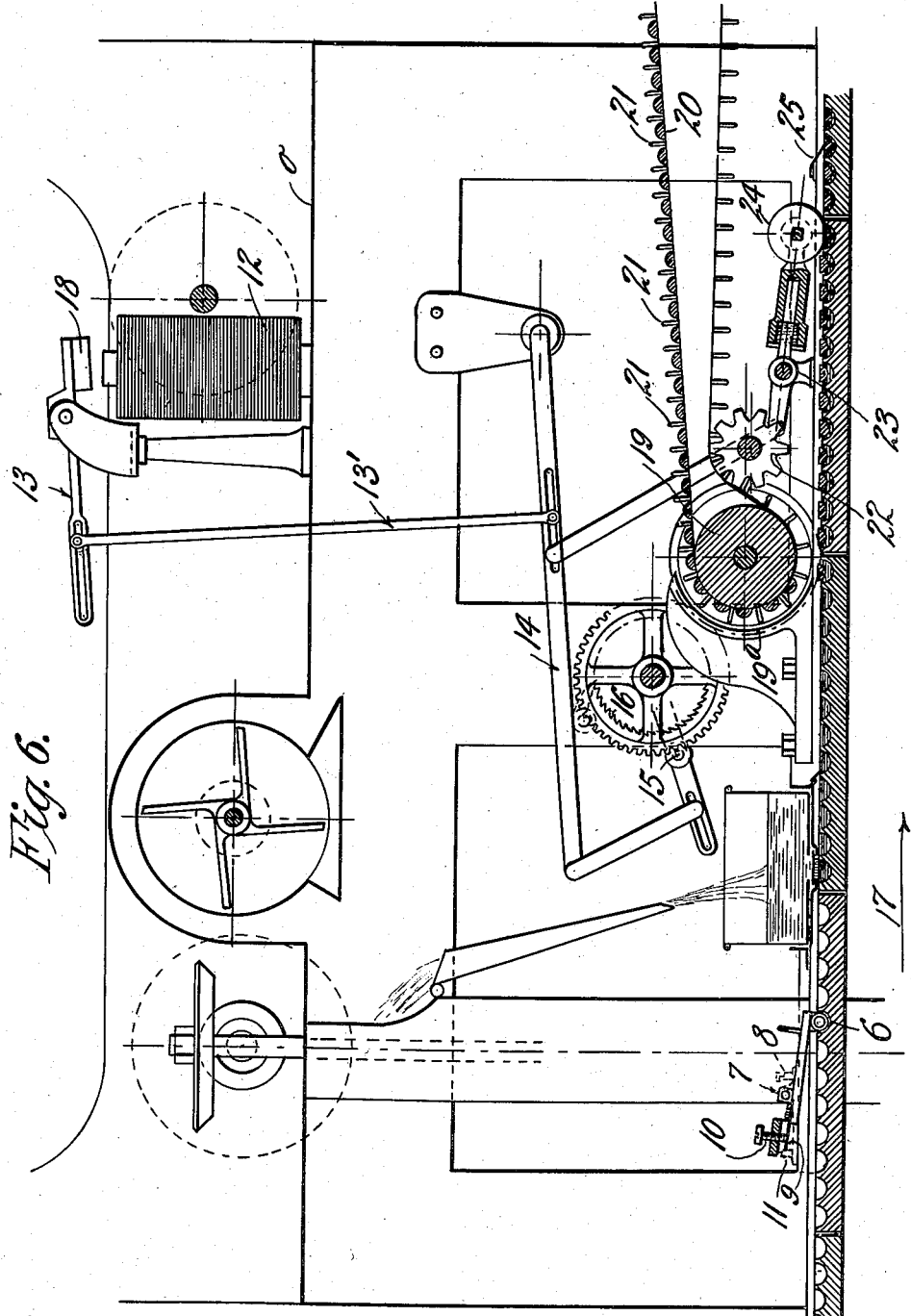

UNITED STATES PATENT OFFICE.

ALFRED HENRI SAVY, OF PARIS, FRANCE.

MACHINE FOR THE MANUFACTURE OF CHOCOLATE CONFECTIONS.

941,537.  Specification of Letters Patent.  Patented Nov. 30, 1909.

Application filed March 7, 1907. Serial No. 361,191.

*To all whom it may concern:*

Be it known that I, ALFRED HENRI SAVY, a citizen of the Republic of France, residing at Paris, France, have invented new and useful Improvements in Machines for the Manufacture of Chocolate Confections, of which the following is a specification.

This invention relates to confectionery machinery and has special reference to machines for filling molds with chocolate paste or the like, the object of the invention being to provide a machine of this character of improved construction, and combining means to heat the molds before filling them, cooling the filled molds and emptying the latter and returning them to the receiving end of the machine again.

Having these ends in view, the invention consists in providing a suitably heated oven to receive the molds which are then filled with the chocolate or other paste in a part of the machine inclosed in a casing which is heated and in which the tank containing the paste is situated, this paste being maintained in the requisite condition of fluidity by any appropriate source of heat. The molds traveling on rails, (the interval between which may be adapted to the dimensions of the molds by any suitable means,) then pass onto a shaking table and then, transported by a conveyer apron, they pass into a refrigerator table. The molds are conveyed by another apron on the refrigerator table at the extremity of which they are collected for emptying, being placed, at the end of this operation, upon a track traveling in the opposite direction. The empty molds are finally placed upon another conveyer device which returns them to the heated chamber.

In order that the invention may be readily and clearly understood, the machine, in accordance therewith for filling chocolate molds, is represented by way of example in the accompanying drawings, in which,—

Figure 1 is a side elevation showing the machine as a whole. Fig. 1ª is also a side elevation, showing on a larger scale, details of that part of the machine in which the molds are filled. Fig. 2 is a vertical section through this part on the median plane of the machine. Fig. 3 is a plan view, and Fig. 4 is a horizontal section through the same part of the machine and on the same scale as Fig. 1ª and Fig. 2. Fig. 5 is a longitudinal section through a modified form of machine for the manufacture of filled chocolates. Fig. 6 shows on a larger scale a longitudinal section of an automatic distributer for fillings.

Referring to these drawings, $a$ indicates the tank in which the chocolate paste is contained where it is submitted to the action of a mixer $b$ driven by the shaft $c$ and is maintained in the appropriate condition of fluidity by means of some convenient source of heat.

The tank $a$ being arranged at the lower part of the machine, the chocolate paste is lifted into the hopper $d$ by means of the screw $e$ rotating in a vertically arranged cylinder and driven by the shaft $f$. At the upper part of the cylinder the paste passes into the hopper $d$ through a discharge device $g$.

The molds, on leaving the oven $i$ (Fig. 1) are arranged at $h$ on rails $k$ and carried by endless chains $j$ which for the purpose are provided with fingers $l$ passing beneath the hopper $d$. The chocolate paste, (the flow of which is facilitated by the rotation of a cylinder $m$ arranged at the opening of the hopper and rotating in the same direction as the molds travel, but at a higher speed,) falls upon the mold, the successive rows of cavities of which it fills in proportion as the mold advances. The cylinder $m$ forces the paste to penetrate all the recesses of the molds, which is more particularly of importance in the case of milk chocolates which are especially viscous.

When the fingers $l$ of the chains $j$ leave the mold, it is pressed on by the following mold; under the influence of this thrust, and still sliding on the rails $k$, it passes beneath a scraper $n$ formed by a transverse plate, the position of which is adjusted so that it just touches the upper part of the molds. The scraper $n$ frees the mold from the excess chocolate paste which falls into the tank $a$. This scraper comprises a plate carrying articulated cheeks which, being acted upon by springs, remain constantly in contact with the sides of the molds and clean them. The whole of this part of the machine is inclosed in a sort of cage $o$ the internal temperature of which is kept at the desired degree by the source of heat so that the fluidity of the chocolate paste is preserved throughout this operation. This cage is provided with an opening $p$ for the admission of the molds and with an opening $q$ for their discharge.

The interval separating the rails $k$ may vary and any appropriate means may be adopted to make this interval correspond to the width of the molds.

Movement is transmitted from the driving shaft $r$ to all the members of this part of the machine by means of chains and pinions, as represented in Figs. 1ª, 2, 3, and 4 of the accompanying drawings.

When the molds leave the cage through the opening $q$ they pass onto the endless apron $s$ (Fig. 1) arranged between the rollers $t$, $t^1$. During the time they are traveling upon the apron $s$ the molds are subjected to a shaking movement caused by the action of ratchets $u$ upon platforms $v$ arranged beneath the upper part of the apron. From the apron $s$ the molds pass onto a similar conveyer $x$ and when arranged on this conveyer they traverse the refrigerating table $y$. The cooling of the molds produced in the table $y$ serves to facilitate the emptying of the molds. On leaving the table $y$, the molds are placed upon an endless apron $z$ serving the mold emptying stations. The endless apron $z$ is similar to the others but moves in the opposite direction. Finally, the empty molds are placed upon a conveyer 1 which extends throughout the entire length of the machine and returns the molds to the oven $i$ where they are heated up in readiness for a fresh operation.

This machine for filling chocolate molds is also applicable for the manufacture of chocolates filled with cream or the like, and to this end the machine comprises a prolongation constituted by a closed and heated box 2 over which the rails $k$ conducting the molds pass; these rails are lengthened for this purpose. The molds, on leaving the filling machine properly so called, then travel on the rails, and operatives stationed on both sides of the machine place the creams in the cavities of the molds as they pass in front of them. These creams are automatically forced into the chocolate by india rubber rollers 3 mounted upon a freely rotating horizontal shaft.

A scraper arranged at 4 equalizes the layer of chocolate forced up by the driving in of the creams and covers them completely. Further, two scrapers arranged upon each side of the molds, clean them, and the excess chocolate will fall upon a lower conveyer 5 which automatically returns the excess to the tank $a$ of the filling machine.

Instead of placing the creams by hand, the automatic device represented in Fig. 6 may be employed. This automatic distributer for inserting the cream-fillings, comprises a roller 6 fixed to a rod rocking around a spindle 7 connected by a terminal 8 to one of the poles of some suitable source of electricity; the extremity of the rod carries a platinized contact 9 which rests upon an adjustable screw 10 which is likewise platinized and which is connected by its support and the terminal 11 with the electric circuit. The roller 6 is insulated, or is of insulating material, in order to avoid loss of current through the molds. In circuit with the contacts 9 and 10 there is arranged at 12 an electromagnet.

The beam 13 is connected to the lever 14 by means of a link $13^1$. The beam 13 is actuated by the armature 18 when the magnet 12 is energized on the closure of the electrocircuit.

The operation is self-explanatory: The molds advance in the direction indicated by the arrow 17, the extremely light roller 6 follows absolutely the whole of their sinuosities; when it reaches the bottom of a recess it establishes an electrical contact at 9 which closes the circuit to the electromagnet, this latter attracting the armature 18 of soft iron which causes the wheel 16 and a drum 19 to advance by a certain amount by means of the lever 14 and the pawl 15. Owing to the slots or openings formed in the levers, it is possible to regulate with great exactitude the angular displacement of the drum 19. Upon this drum, which is surrounded by a circular casing 19ª, there is wound a belt 20 carrying recesses 21 in which the creams are placed during the travel to the exterior of the chamber $o$; a toothed roller 22 driven by gears or a chain from the drum 19 opposes any tendency of the device to get out of order by preventing any slip of the belt. The whole being arranged in this manner, (taking the fillings at the moment at which they are deposited in the recesses of the molds,) it will be noted that they are upon the surface of the chocolate; in order to immerse them in the mass, these molds pass beneath a shaft 23 carrying a series of small india rubber rollers 24 which, by their pressure, force the fillings of cream to the bottom of the mold; the displaced chocolate forms protuberances all around, and these are equalized and smoothed down by a scraper 25, thereby covering the end of the fillings.

What I claim, is:—

1. A mold filling machine for chocolate and the like comprising the following instrumentalities in combination: a receptacle for suitable fluid paste, depositing devices to fill a series of molds moving past said devices, and mechanism to elevate the paste from the receptacle to the depositing devices, a shaking table, and a refrigerating table, and means to move the molds successively past the depositing device and over the shaking table to the refrigerating table, together with means located beyond the latter to receive and empty the molds.

2. In a mold filling machine for chocolates and the like, a receptacle for paste, and means to deposit the paste in the molds, said receptacle and depositor being located in a suitably heated chamber; refrigerating means and mold emptying devices, and a suitable conveyer extending from said heated chamber to the refrigerating means and mold emptying device and a conveyer extending from the latter to said heated chamber.

3. In a mold filling machine for chocolates and the like, a receptacle for paste, and means to deposit the paste in the molds, said receptacle and depositor being located in a suitably heated chamber; refrigerating means and mold emptying devices, and a suitable conveyer extending from said heated chamber to the refrigerating means and mold emptying devices, and a conveyer extending from the latter to said heated chamber, together with scraping devices located in the path of the mold bearing upon the edges of the latter.

ALFRED HENRI SAVY.

Witnesses:
 AUG. GRAFF,
 J. MÜLLER.